(12) United States Patent
Berry et al.

(10) Patent No.: US 8,768,388 B2
(45) Date of Patent: Jul. 1, 2014

(54) METHOD AND APPARATUS FOR UE REACHABILITY SUBSCRIPTION/NOTIFICATION TO FACILITATE IMPROVED MESSAGE DELIVERY

(75) Inventors: Nigel H. Berry, Tetbury (GB); Suzann Hua, Lisle, IL (US)

(73) Assignee: Alcatel Lucent, Paris (FR)

( * ) Notice: Subject to any disclaimer, the term of this patent is extended or adjusted under 35 U.S.C. 154(b) by 369 days.

(21) Appl. No.: 12/754,802

(22) Filed: Apr. 6, 2010

(65) Prior Publication Data

US 2010/0261490 A1 Oct. 14, 2010

Related U.S. Application Data

(60) Provisional application No. 61/212,307, filed on Apr. 9, 2009.

(51) Int. Cl.
*H04W 4/00* (2009.01)
(52) U.S. Cl.
USPC .......................................................... 455/466
(58) Field of Classification Search
USPC .......................................................... 455/466
See application file for complete search history.

(56) References Cited

U.S. PATENT DOCUMENTS

2007/0223428 A1 9/2007 Patterson et al.

FOREIGN PATENT DOCUMENTS

WO   WO 9926432 A1    5/1999
WO   WO 03094553 A1   11/2003

OTHER PUBLICATIONS

Alcatel-Lucent: "Update of 23.204 for SMS over IP procedures for E-UTRAN" 3GPP Draft; S2-086108, Aug. 29, 2008.
Alcatel-Lucent: "Update of 23.204 for SMS over IP procedures for E-UTRAN" 3GPP Draft, S2-085724, Aug. 19, 2008.
Alcatel-Lucent. "Update of .204 for SMS over IP procedures for E-UTRAN" 3GPP Draft' S2-086375, Aug. 31, 2008.
"3rd Generation Partnership Project; Technical Specification Group Services and System Aspects; Support of Short Message Service (SMS) over generic 3GPP Internet Protocol (IP) access; Stage 2 (Release 8)", No. V8.3.0, Sep. 1, 2008, pp. 1-37.
Alcatel-Lucent: "Update of 23.401 for SMS procedures for E-UTRAN" 3GPP Draft; S2-086374, Aug. 31, 2008.
"3rd Generation Partnership Project; Technical Specification Group Services and System Aspects; General Packet Radio Services (GPRS) enhancements for Evolved Universal Terrestrial Radio Access Network (E-UTRAN) access (Release 8)", No. V8.5.0, Mar. 1, 2009, pp. 1-223.
Alcatel-Lucent: "Discussion on SMS necessary mechanisms for E-UTRAN" 3GPP Draft; S2-085722, Aug. 19, 2008.
"3rd Generation Partnership Project; Technical Specification Group Core Network and Terminals; Evolved Packet System (EPS); Mobility Management Entity (MME) and Serving GPRS Support Node (SGSN) related interfaces based on Diameter protocol (Release 8)", V8.2.0, Mar. 1, 2009, pp. 1-67.

(Continued)

*Primary Examiner* — Justin Lee
(74) *Attorney, Agent, or Firm* — Fay Sharpe LLP

(57) ABSTRACT

A method of handling data sessions between user devices in a network is disclosed. The method includes receiving at a first network element an indication of non-delivery of a short message service message directed to a user device. Next, an insert subscriber data request message is sent to a second network element, wherein the insert subscriber data request message includes a flag that informs the second network element of the non-delivery of the short message service message and requests that the second network element notify the first network element when the user device is reachable. The first network element receives an insert subscriber data request answer from the second network element.

25 Claims, 2 Drawing Sheets

(56) References Cited

OTHER PUBLICATIONS

Alcatel-Lucent et al: Notification of SMS over IP Non-Delivery for E-UTRAN and UE Reachability, 3GPP Draft; C4-91018, Apr. 9, 2009.
Alcatel-Lucent et al: "Notification of SMS over IP Non-Delivery for E-UTRAN and UE Reachability", 3GPP Draft; C4-091382, Apr. 24, 2009.
International Search Report, Jun. 28, 2010.
3$^{rd}$ Generation Partnership Project: Technical Specification Group Core Network and Terminals; Technical realization of the Short Message Service (SMS) (Release 8), 3GPP TS 23.040 V8 4.0 (Mar. 2009).
Korean Search Report dated Aug. 21, 2013.
Universal Mobile Telecommunications System (UMTS); Support of Short Message Service (SMS) over Generic 3GPP Internet Protocol (IP) Access; Stage 2, (3GPP TS 23.204 Version 8.3.0 Release 8, Oct. 2008).
Chinese Search Report dated Aug. 16, 2013.

METHOD AND APPARATUS FOR UE REACHABILITY SUBSCRIPTION/NOTIFICATION TO FACILITATE IMPROVED MESSAGE DELIVERY

This application claims priority from U.S. Provisional Application Ser. No. 61/212,307 filed on Apr. 9, 2009.

BACKGROUND OF THE INVENTION

This invention relates to a method and apparatus for User Equipment reachability subscription/notification to facilitate improved message delivery.

While the invention is particularly directed to the art of mobile telecommunications, and will be thus described with specific reference thereto, it will be appreciated that the invention may have usefulness in other fields and applications.

By way of background, LTE (Long Term Evolution) is a rapidly evolving 3GPP project that aims to improve the UMTS (Universal Mobile Telecommunications System) mobile phone standard to cope with future communication network demands. LTE will improve wireless network efficiency/bandwidth, lower costs and enhance services experience. Specifically, LTE will make use of new spectrum opportunities and offer better integration with other open standards. LTE is composed of LTE RAN (Radio Access Network) (also known as E-UTRAN) along with the EPS (Evolved Packet System, also called Evolved Packet Core).

SMS (or Short Message Service) is a method of communication that sends text between cell phones, or from a PC or handheld to a cell phone. The "short" part refers to the maximum size of the text messages: typically 160 characters (letters, numbers or symbols in the Latin alphabet).

In certain legacy systems there is a legacy CS (Circuit Switch) domain and PS (Packet Switch) domain. In CS and PS domains, the SMS delivery is retried when the UE (User Equipment) is detected by any NAS (Non-Access-Stratum) procedure such as LAU/RAU (Location Area Update/Routing Area Update), etc. by the MSC/VLR (Mobile Switching Center/Visitor Location Register) or the SGSN (Serving GPRS Support Node). For SMS over IP (Internet Protocol), it is detected via an IMS (IP Multimedia Subsystem) Register by the HSS (Home Subscriber Server), but also by the MSC/VLR or SGSN as the delivery of the SMS message is tried on several domains.

Currently in LTE networks/standards, however, there is no mechanism for the HSS to notify the MME (Mobility Management Entity) that an SMS message has failed to be delivered via SMS over IP and request the MME to notify the HSS when the applicable UE becomes reachable. There is also no mechanism for the MME to notify the HSS of the UE's reachability.

The present invention contemplates a new and improved method and apparatus that resolves the above-referenced difficulties and others.

SUMMARY OF THE INVENTION

A method and apparatus for facilitating improved message delivery are provided.

In one aspect of the invention a method of handling data sessions between user devices in a network is provided. The method includes: receiving at a first network element an indication of non-delivery of a short message service message directed to a user device; sending an insert subscriber data request message to a second network element, wherein the insert subscriber data request message includes a flag that informs the second network element of the non-delivery of the short message service message and requests that the second network element notify the first network element when the user device is reachable; and receiving at the first network element an insert subscriber data request answer from the second network element.

In another aspect of the invention a method of handling data sessions between user devices in a network is provided. The method includes: receiving at a first network element an insert subscriber data request message from a second network element, wherein the insert subscriber data request message includes a flag that informs the first network element of the non-delivery of a short message service message to a user device and requests that the first network element notify the second network element when the user device is reachable; storing the insert subscriber data request message in a database operatively connected to the first network element; receiving an indication that the user device is now able to receive the short message service message; and sending a notify request message to the second network element, wherein the notify request message includes a flag indicating that the user device is now able to receive the short message service message.

In yet another aspect of the invention a computer program product is provided. The product includes computer-usable data carrier storing instructions that, when executed by a computer, cause the computer to perform a method including the steps of: receiving at a first network element an indication of non-delivery of a short message service message directed to a user device; sending an insert subscriber data request message to a second network element, wherein the insert subscriber data request message includes a flag that informs the second network element of the non-delivery of the short message service message and requests that the second network element notify the first network element when the user device is reachable; and receiving at the first network element an insert subscriber data request answer from the second network element.

In yet another aspect of the invention an apparatus for handling data sessions between user devices in a network is provided. The apparatus includes a database that stores the insert subscriber data request message in a database operatively connected to the first network element and a first network element. The first network element is operative to: receive an insert subscriber data request message from a second network element, wherein the insert subscriber data request message includes a flag that informs the first network element of the non-delivery of a short message service message to a user device and requests that the first network element notify the second network element when the user device is reachable; receive an indication that the user device is now able to receive the short message service message; and send a notify request message to the second network element, wherein the notify request message includes a flag indicating that the user device is now able to receive the short message service message.

Further scope of the applicability of the present invention will become apparent from the detailed description provided below. It should be understood, however, that the detailed description and specific examples, while indicating preferred embodiments of the invention, are given by way of illustration only, since various changes and modifications within the spirit and scope of the invention will become apparent to those skilled in the art.

DESCRIPTION OF THE DRAWINGS

The present invention exists in the construction, arrangement, and combination of the various parts of the device, and steps of the method, whereby the objects contemplated are attained as hereinafter more fully set forth, specifically pointed out in the claims, and illustrated in the accompanying drawings in which:

DETAILED DESCRIPTION

Figure 1:
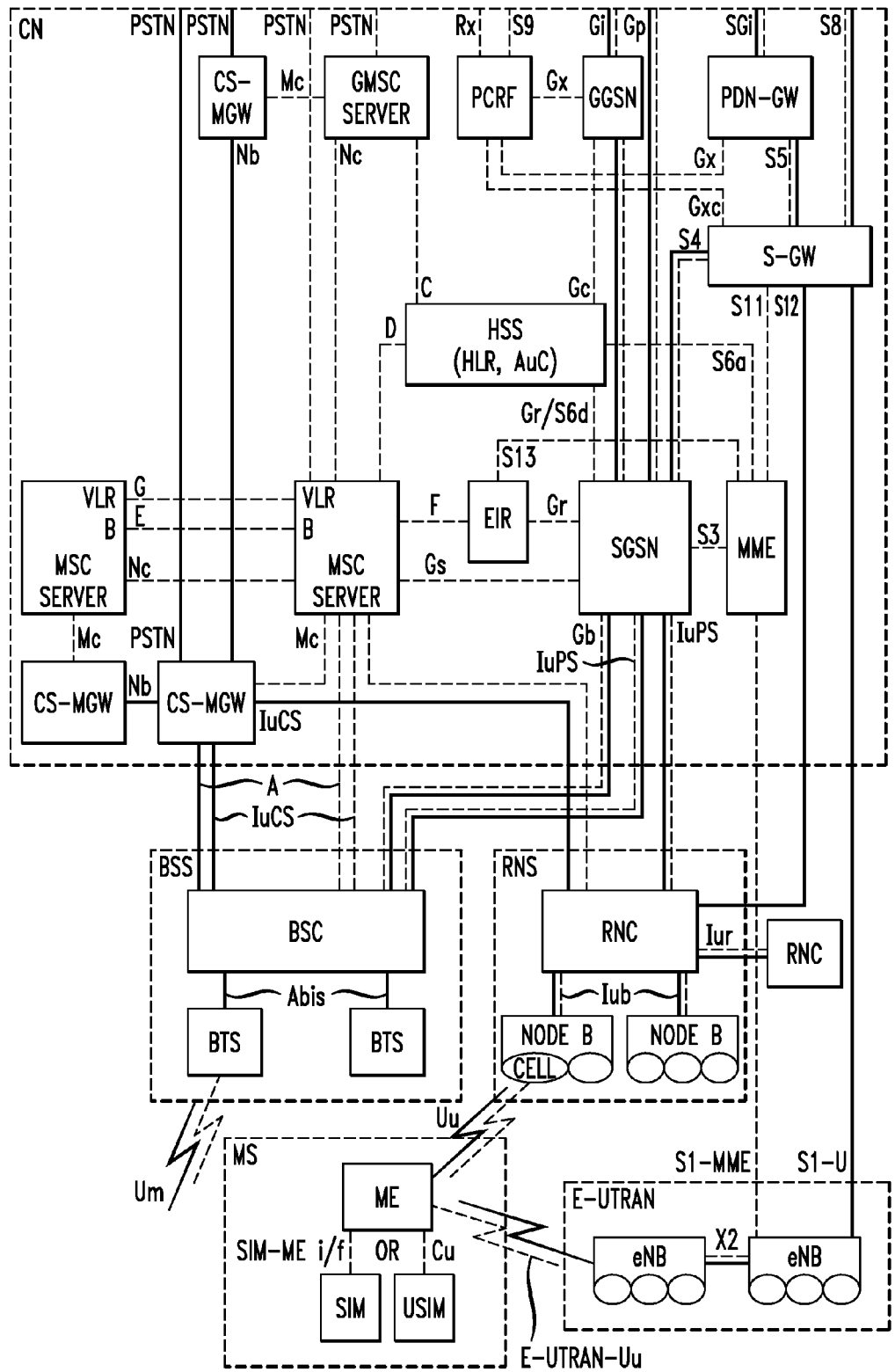
FIG. 1 illustrates an exemplary mobile system into which the presently described embodiments may be incorporated.

Referring now to the drawings wherein the showings are for purposes of illustrating the exemplary embodiments only and not for purposes of limiting the claimed subject matter, FIG. 1 provides a view of an exemplary mobile system into which the presently described embodiments may be incorporated.

The basic configuration of a Public Land Mobile Network (PLMN) supporting PS Domain (both GPRS and EPC) and the interconnection to the PSTN/ISDN and PDN is presented in FIG. 1. This configuration presents signaling and user traffic interfaces that can be found in a PLMN. Implementations may be different, that is, some particular functions may be gathered in the same equipment and then some interfaces may become internal interfaces. In the basic configuration presented in FIG. 1, all the functions are considered implemented in different equipment. Therefore, all the interfaces within PLMN are external.

As shown generally, the basic parts of the mobile system include: a Core Network (CN), an Access Network (AN: BSS, RNS), and at least one Mobile Station (MS)/User Equipment (UE).

The entities common to the PS and CS domain include the following: Home Subscriber Server (HSS), Home Location Register (HLR), Authentication Center (AuC), Visitor Location Register (VLR), Equipment Identity Register (EIR), SMSGateway MSC (SMS-GMSC), SMSInterworking MSC (SMS-IWMSC), Subscription Locator Function (SLF), Border Gateway (BG).

The entities of the CS domain include the following: Mobile-services Switching Center (MSC), MSC Server, Circuit Switched-Media Gateway Function (CS-MGW), Gateway MSC (GMSC), Gateway MSC Server (GMSCServer), Interworking Function (IWF).

The entities of the GPRSPS domain include the following: Serving GPRSSupport Node (SGSN) and Gateway GPRSSupport Node (GGSN).

The entities of the EPCPS Domain include the following: MME, Gateways, Serving GW, PDNGW, SGSN, Trusted and UntrustedNon-3GPP, ePDG, 3GPP AAAServer, 3GPP AAAProxy.

The Access Network (AN) entities include the following: Base Station System (BSS), Base Station Controller (BSC), Base Transceiver Station (BTS), Radio Network System (RNS), Radio Network Controller (RNC), Node B, Access Network elements for E-UTRAN, E-UTRAN Node B (eNB), Evolved UTRAN, Mobile Station (MS), User Equipment (UE).

Figure 2:
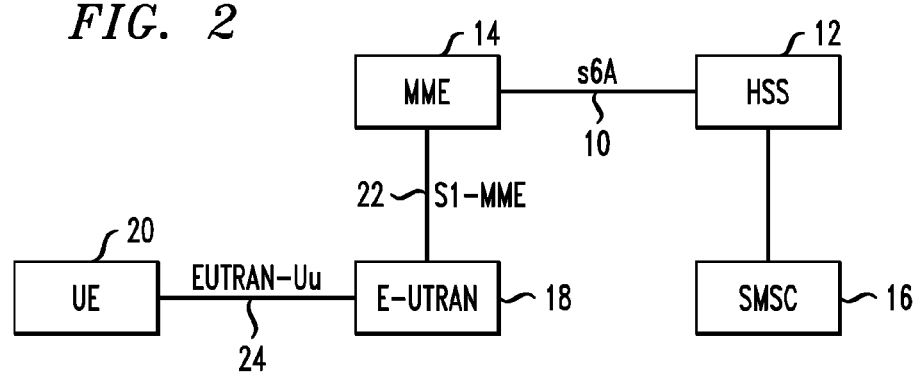
FIG. 2 shows the LTE Diameter S6a interface between the HSS and the MME.

With reference now to FIG. 2, the embodiments herein are focused on the LTE Diameter S6a interface 10 between the HSS 12 and the MME 14, along with several other network elements. FIG. 2 also includes an SMSC (Short Message Service Center) 16, E-UTRAN 18, UE (or user device) 20, and a pair of additional interfaces, namely, S1-MME 22 between the MME 14 and the E-UTRAN 18 and EUTRAN-Uu 24 between the E-UTRAN 18 and the UE 20.

The S6a interface 10 generally enables transfer of subscription and authentication data of authenticating/authorizing user access to the evolved system (AAA interface) between the MME 14 and the HSS 12.

The HSS 12 typically functions as the master database for a given user. It is the entity containing the subscription-related information to support the network entities actually handling calls/sessions. A Home Network may contain one or several HSSs, depending on the number of mobile subscribers, on the capacity of the equipment and on the organization of the network. As an example, the HSS 12 may provide support to the call control servers in order to complete the routing/roaming procedures by solving authentication, authorization, naming/addressing resolution, location dependencies, etc.

The MME (Mobility Management Entity) 14 is essentially a control-node for the LTE access-network. The MME 14 is responsible for idle mode UE (User Equipment) tracking and paging procedure including retransmissions. The MME 14 is involved in the bearer activation/deactivation process and is also responsible for choosing the SGW for a UE at the initial attach and at time of intra-LTE handover involving Core Network (CN) node relocation. The MME 14 is responsible for authenticating the user (by interacting with the HSS). The MME 14 is in charge of all the Control plane functions related to subscriber and session management. The MME 14 is linked through the S6a interface to the HSS 12, which supports the database containing all the user subscription information. The S6a interface to the HSS 12 is based on the Diameter protocol. The base protocol defines the basic Diameter message format. Data is carried within a Diameter message as a collection of Attribute Value Pairs (AVP). An AVP consists of multiple fields: an AVP Code, a Length, Flags, and Data. Some AVPs are used by the Diameter base protocol, while other AVPs are intended for the Diameter application.

The SMSC 16 is a network element in the mobile telephone network which delivers SMS messages. Generally, when a user sends a text message (SMS message) to another user, the message gets stored in the SMSC, which delivers it to the destination user when they are available. It should be noted that the SMSC may also be replaced or combined with an IP-Short-Message-Gateway (IP-SM-GW).

The E-UTRAN (or eUTRAN) 18 is the air interface of 3GPP's Long Term Evolution (LTE) upgrade path for mobile networks. It is the abbreviation for evolved UMTS Terrestrial Radio Access Network The UE 20 is any device used directly by an end-user to communicate. It can be a hand-held telephone, a card in a laptop computer, or any other device. It connects to the base station ("Node B", or 3G Base Transceiver Station). It roughly corresponds to the mobile station (MS) in GSM systems. The radio interface between the UE and the Node B is called Uu.

A new HSS notification mechanism with the Diameter S6a IDR (Insert Subscriber Data Request) to notify the MME that an SMS message has failed to be delivered via SMS over IP is described herein. Insert Subscriber Data is a MAP subscriber management service utilized in GSM/UMTS networks, standardized by 3GPP. This service is used to provide specific subscriber data in the present environment by an HSS to update a MME via IWF (Interworking Function). This service is primarily used by the home subscriber management entity to update the serving subscriber management entity when there is either a change in a subscriber parameter, or upon a location updating of the subscriber In certain embodiments, after the MME 14 receives an HSS request, the MME 14 will notify the HSS 12 when the UE 20 becomes reachable. The HSS 12 will then initiate an Alert service procedure to the appropriate SMSC 16 as needed. Upon receipt of the Alerting message, the SMSC 16 will re-attempt to send the stored SMS message to the UE 20.

Embodiments are described herein to enhance and expand the Diameter S6a message IDR (Insert Subscriber Data Request) for HSS to notify the MME 14 that an SMS message has failed to be delivered via SMS over IP. A new IDR-Flags AVP will be added to the S6a IDR message to serve this purpose to request the MME 14 to notify the HSS 12 when the UE 20 becomes reachable. This new IDR-Flags AVP will expand the existing S6a IDR message scope, which currently is only used to notify the MME/SGSN that the subscriber's service data has been changed. The new IDR-Flags AVP allows multiple request bits, and therefore enables future opportunities, making IDR message more powerful and versatile. In addition, embodiments are disclosed herein that enhance the Diameter S6a message NOR (Notify-Request) for the MME 14 to notify the HSS 12 when the UE 20 becomes reachable.

HSS Notification to MME For SMS Over IP Non-Delivery

Figure 3:
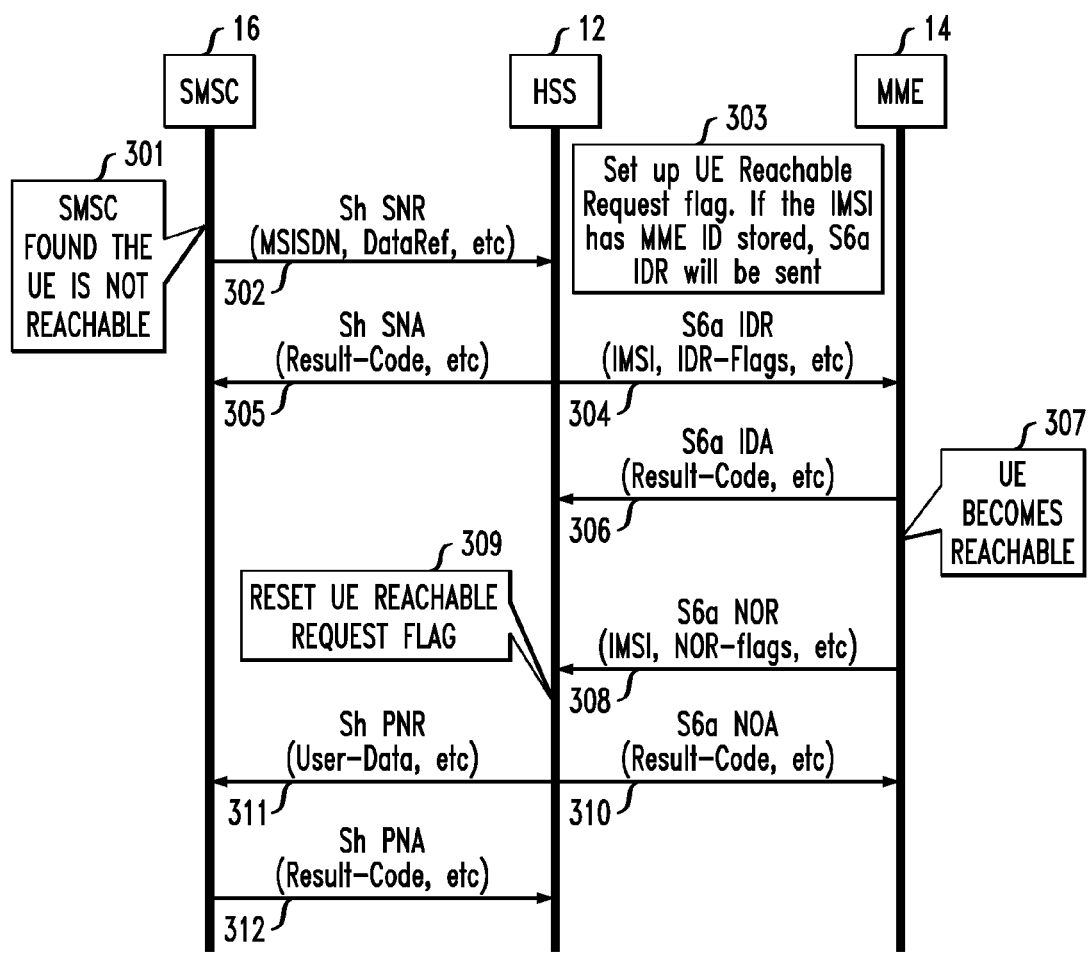
FIG. 3 shows an exemplary message flow in accordance with aspects of the present invention.

FIG. 3 shows an exemplary message flow in accordance with aspects of the present invention. It is noted that there is a Diameter Sh interface between the SMSC 16 and the HSS 12.

Initially the SMSC 16 finds that an SMS message has failed to be delivered via SMS over IP to the UE 20, i.e., the UE 20 is not reachable (301).

The HSS 12 may then detect such SMS message failure when the HSS 12 receives a Diameter Sh SNR (Subscribe-Notifications-Response) message from the SMSC 16 for the UE reachability subscription (302). The HSS 12 then sets up a UE Reachable Request Flag (303). If the International Mobile Subscriber Identity (IMSI) has the MME ID stored, then the HSS 12 sends a Diameter S6a IDR (Insert-Subscriber-Data-Request) message to the MME 14 with a new "IDR-Flags" AVP (304), which indicates to the MME 14 that a particular SMS message has failed to be delivered via SMS over IP for the UE 20. Such an IDR message allows the HSS 12 to request the MME 14 to notify the HSS 12 when the UE 20 becomes reachable. In addition, the HSS 12 sends a Diameter Sh SNA (Subscribe-Notifications-Answer) message to the SMSC 16 (305). The MME 14 responds to the HSS 12 with a Diameter S6a IDA (Insert-Subscriber-Data-Answer) message (306).

This new "IDR-Flags" AVP being added to the Diameter S6a IDR expands the existing S6a IDR message scope (currently the message is only used to notify MME/SGSN the subscriber's service data has been changed). In addition, this new IDR-Flags AVP allows multiple request bits, and therefore enables future opportunities, making the IDR message more powerful and versatile.

In one embodiment, the new IDR-Flags AVP is of type Unsigned32 and contains a bit mask. Unsigned32 specifies a value whose range includes only non-negative integers (0 to 4294967295). The meaning of the bit(s) may be as defined in the following table:

TABLE 1

| Bit | Name | Description |
| --- | --- | --- |
| 0 | UE Reachability Request | This bit, when set, shall indicate to the MME that the HSS is awaiting a Notification of UE Reachability. |

Note:
Bits not defined in this table shall be cleared by the sending HSS and discarded by the receiving MME or SGSN.

MME Notification to HSS For UE Reachability

When the MME 14 receives the aforementioned IDR message from the HSS 12, the MME 14 stores the HSS's request for UE reachability notification in a suitable database. In the event the MME 14 detects that the UE 20 has become reachable and according to the HSS request stored at the MME 14 (307), the MME 14 sends the HSS 12 a Diameter S6a Notify-Request (NOR) message with a NOR-Flags AVP, indicating that the UE 20 is now reachable (308).

The UE reachable indication may be specified as bit 3 of NOR-Flags AVP, which may be of type Unsigned32 and may contain a bit mask as described in the following table:

TABLE 2

| Bit | name | Description |
| --- | --- | --- |
| 0 | Single-Registration-Indication | This bit, when set, shall indicate that the HSS shall send a Cancel Location message to the current SGSN due to ISR. An SGSN shall not set this bit when sending NOR. |
| 1 | SGSN area restricted | This bit, when set, shall indicate that the complete SGSN area is restricted due to regional subscription. |
| 2 | Ready for SM | This bit, when set, shall indicate that the UE is present or the UE has memory capacity available to receive one or more short messages. |
| 3 | UE Reachable for SMS | This bit, when set, shall indicate that the UE has become reachable again. |

Note:
Bits not defined in this table shall be cleared by the sending MME or SGSN and discarded by the receiving HSS.

The bit 3 of NOR-Flags AVP is used to indicate the UE has become reachable.

The HSS 12 resets the UE Reachable Request flag (309). The HSS 12 then sends a Diameter S6a NOA (Notify-Answer) message to the MME 14 (310) and a Diameter Sh PNR (Push-Notification-Response) message to the SMSC 16 (311). Finally, the SMSC 16 sends a Diameter Sh PNA (Push-Notification-Answer) to the HSS 12 (312).

Thus, to summarize, when the HSS detects an SMS message has failed to be delivered via SMS over IP, the HSS sends a Diameter S6a message IDR to the MME with a new "IDR-Flags" AVP, which indicates to the MME 14 that an SMS message has failed to be delivered via SMS over IP for the UE 20. This can also serve the purpose for the HSS 12 to request the MME 14 to notify the HSS 12 when the UE 20 becomes reachable. The new IDR-Flags AVP added to the S6a IDR message can be used to expand the existing S6a IDR message scope. The new IDR-Flags AVP may be of type Unsigned32 and contain a bit mask of multiple bits. When the MME 14 detects that the UE 20 has becomes reachable, and based on the HSS request stored at the MME 14, the MME 14 will send the HSS 12 a Diameter S6a NOR message with a NOR-Flags AVP indicating that the UE 20 is now reachable.

It is to be appreciated that suitably, the methods and systems described herein are embodied by a computer, or other digital processing device including a digital processor, such as a microprocessor, microcontroller, graphic processing unit (GPU), etc. and storage. In other embodiments, the systems and methods may be embodied by a server including a digital processor and including or having access to digital data storage, such server being suitably accessed via the Internet or a local area network, or by a personal data assistant (PDA) including a digital processor and digital data storage, or so forth. The computer or other digital processing device suitably includes or is operatively connected with one or more user input devices, such as a keyboard, for receiving user input, and further includes, or is operatively connected with, one or more display devices. In other embodiments, the input for controlling the methods and systems is received from another program running previously to or concurrently with the methods and systems on the computer, or from a network connection, or so forth. Similarly, in other embodiments the output may serve as input to another program running subsequent to or concurrently with methods and systems on the computer, or may be transmitted via a network connection, or so forth.

In some embodiments, the exemplary methods, discussed above, the system employing the same, and so forth, of the present application are embodied by a storage medium storing instructions executable (for example, by a digital processor) to implement the exemplary methods and/or systems. The storage medium may include, for example: a magnetic disk or other magnetic storage medium; an optical disk or other optical storage medium; a random access memory (RAM), read-only memory (ROM), or other electronic memory device or chip or set of operatively interconnected chips; an Internet server from which the stored instructions may be retrieved via the Internet or a local area network; or so forth.

It is to further be appreciated that in connection with the particular exemplary embodiments presented herein certain structural and/or functional features are described as being incorporated in defined elements and/or components. However, it is contemplated that these features may, to the same or similar benefit, also likewise be incorporated in other elements and/or components where appropriate. It is also to be appreciated that different aspects of the exemplary embodiments may be selectively employed as appropriate to achieve other alternate embodiments suited for desired applications, the other alternate embodiments thereby realizing the respective advantages of the aspects incorporated therein.

It is also to be appreciated that particular elements or components described herein may have their functionality suitably implemented via hardware, software, firmware or a combination thereof. Additionally, it is to be appreciated that certain elements described herein as incorporated together may under suitable circumstances be stand-alone elements or otherwise divided. Similarly, a plurality of particular functions described as being carried out by one particular element may be carried out by a plurality of distinct elements acting independently to carry out individual functions, or certain individual functions may be split-up and carried out by a plurality of distinct elements acting in concert. Alternately, some elements or components otherwise described and/or shown herein as distinct from one another may be physically or functionally combined where appropriate.

In short, the present specification has been set forth with reference to preferred embodiments. Obviously, modifications and alterations will occur to others upon reading and understanding the present specification. It is intended that the invention be construed as including all such modifications and alterations insofar as they come within the scope of the appended claims or the equivalent thereof. That is to say, it will be appreciated that various of the above-disclosed and other features and functions, or alternatives thereof, may be desirably combined into many other different systems or applications, and also that various presently unforeseen or unanticipated alternatives, modifications, variations or improvements therein may be subsequently made by those skilled in the art which are similarly intended to be encompassed by the following claims.

We claim:

1. A method of handling data sessions between user devices in a network, the method comprising:
   receiving at a first network element an indication of non-delivery of a short message service message directed to a user device;
   sending a Diameter S6a insert subscriber data request (IDR) message to a second network element, wherein the insert subscriber data request message includes an IDR-flags attribute value pair (AVP) that informs the second network element of the non-delivery of the short message service message and requests that the second network element notify the first network element when the user device is reachable; and
   receiving at the first network element a Diameter S6a notify request message (NOR) with a NOR-flags AVP indicating that the user device is now reachable from the second network element.

2. The method of claim 1, wherein the IDR-flags AVP is of type Unsigned 32 and contains a bit mask and bit 0 indicates to the second network element that the first network element is awaiting a notification of user device reachability.

3. The method of claim 1, wherein the network comprises a Long Term Evolution (LTE) access network.

4. The method of claim 3, wherein the first network element comprises a home subscriber server (HSS).

5. The method of claim 4, wherein the second network element comprises a mobility management entity (MME).

6. The method of claim 1, further comprising:
   sending a subscribe notifications answer to a short message service center.

7. A method of handling data sessions between user devices in a network, the method comprising:
   receiving at a first network element a Diameter S6a insert subscriber data request (IDR) message from a second network element, wherein the insert subscriber data request message includes an IDR-flags attribute value pair (AVP) that informs the first network element of the non-delivery of a short message service message to a user device and requests that the first network element notify the second network element when the user device is reachable;
   storing the insert subscriber data request message in a database operatively connected to the first network element;
   receiving an indication that the user device is now able to receive the short message service message; and
   sending a Diameter S6a notify request (NOR) message to the second network element, wherein the notify request message includes a NOR-flags AVP indicating that the user device is now able to receive the short message service message.

8. The method of claim 7, wherein the IDR-flags AVP is of type Unsigned 32 and contains a bit mask and bit 0 indicates to the second network element that the first network element is awaiting a notification of user device reachability.

9. The method of claim 7, wherein the network comprises a Long Term Evolution (LTE) access network.

10. The method of claim 9, wherein the second network element comprises a home subscriber server (HSS).

11. The method of claim 10, wherein the first network element comprises a mobility management entity (MME).

12. The method of claim 7, wherein the NOR-flags AVP is of type Unsigned 32 and contains a bit mask and bit 3 indicates that the user device has become reachable.

13. A computer program product comprising:
a non-transitory computer-usable data carrier storing instructions that, when executed by a computer, cause the computer to perform a method comprising
receiving at a first network element non-delivery of a short message service message directed to a user device;
sending a Diameter S6a insert subscriber data request (IDR) message to a second network element, wherein the insert subscriber data request message includes an IDR-flags attribute value pair (AVP) that informs the second network element of the non-delivery of the short message service message and requests that the second network element notify the first network element when the user device is reachable; and
receiving at the first network element a Diameter S6a notify request (NOR) message from the second network element, wherein the notify request message includes a NOR-flags AVP indicating that the user device is now reachable.

14. The product of claim 13, wherein the IDR-flags AVP is of type Unsigned 32 and contains a bit mask and bit 0 indicates to the second network element that the first network element is awaiting a notification of user device reachability.

15. The product of claim 13, wherein the network comprises a Long Term Evolution (LTE) access network.

16. The product of claim 15, wherein the first network element comprises a home subscriber server (HSS).

17. The product of claim 16, wherein the second network element comprises a mobility management entity (MME).

18. The computer program product of claim 13, wherein the method further comprises:
sending a subscribe notifications answer to a short message service center.

19. An apparatus for handling data sessions between user devices in a network, the apparatus comprising:
a database that stores the insert subscriber data request message in a database operatively connected to the first network element; and
a first network element that is operative to: receive a S6a Diameter insert subscriber data request (IDR) message from a second network element, wherein the insert subscriber data request message includes an IDR-flags attribute value pair (AVP) that informs the first network element of the non-delivery of a short message service message to a user device and requests that the first network element notify the second network element when the user device is reachable; and receive an indication that the user device is now able to receive the short message service message; and
a second network element that is operative to send a Diameter S6a notify request message (NOR) to the second network element, wherein the notify request message includes a NOR-flags AVP indicating that the user device is now able to receive the short message service message.

20. The apparatus of claim 19, wherein the IDR-flags AVP is of type Unsigned 32 and contains a bit mask and bit 0 indicates to the second network element that the first network element is awaiting a notification of user device reachability.

21. The apparatus of claim 19, wherein the network comprises a Long Term Evolution (LTE) access network.

22. The apparatus of claim 21, wherein the first network element comprises a home subscriber server (HSS).

23. The apparatus of claim 22, wherein the second network element comprises a mobility management entity (MME).

24. The apparatus of claim 19, wherein the second network element is further operative to:
store the insert subscriber data request message in a database operatively connected to the second network element; and
receive an indication that the user device is now able to receive the short message service message.

25. A method for a home subscriber server to control a message delivery service in a wireless communications network, the method comprising:
receiving an indication of non-delivery of a message directed to a user device from a message service center;
sending a Diameter S6a insert subscriber data request (IDR) message to a mobile management entity, wherein the insert subscriber data request message includes an IDR-flags attribute value pair (AVP) that informs the mobile management entity of the non-delivery of the message and requests that the mobile management entity notify the home subscriber server when the user device is reachable;
receiving a Diameter S6a notify request message (NOR) with a NOR-flags AVP indicating that the user device is now reachable from the mobile management entity; and
responsive to the notify request message with the NOR-flags AVP, sending to the message service center an indication to deliver the message to the user device.

* * * * *